United States Patent
Yoshinaga et al.

[11] Patent Number: 5,818,489
[45] Date of Patent: Oct. 6, 1998

[54] IMAGE FORMING APPARATUS AND PROCESS CARTRIDGE HAVING EXPOSURE DEVICE USING LIGHT BEAM HAVING SPECIFIC SPOT AREA

[75] Inventors: Kazuo Yoshinaga, Kawasaki; Kiyoshi Sakai, Hachiohji; Yukio Nagase; Yuichi Hashimoto, both of Tokyo; Mamoru Tanaka, Yokohama, all of Japan

[73] Assignee: Canon Kabushiki Kaisha, Tokyo, Japan

[21] Appl. No.: 568,299

[22] Filed: Dec. 6, 1995

[30] Foreign Application Priority Data

Dec. 7, 1994 [JP] Japan .................................. 6-303948

[51] Int. Cl.⁶ .................................................. G01D 15/14
[52] U.S. Cl. .......................................... 347/131; 347/254
[58] Field of Search ..................................... 355/211, 212, 355/213; 347/252, 131, 153, 254, 264; 399/159, 177, 181

[56] References Cited

U.S. PATENT DOCUMENTS

| | | |
|---|---|---|
| 4,753,867 | 6/1988 | Arakawa et al. . |
| 4,761,359 | 8/1988 | Sakai et al. ............................. 430/126 |
| 4,826,747 | 5/1989 | Chiba et al. . |
| 4,910,536 | 3/1990 | Fujimura et al. . |
| 4,929,529 | 5/1990 | Kinoshita ............................ 430/127 |
| 4,963,452 | 10/1990 | Kinoshita ............................ 430/78 |
| 5,021,807 | 6/1991 | Kinoshita . |
| 5,057,851 | 10/1991 | Hattori . |
| 5,115,259 | 5/1992 | Itoh . |
| 5,313,233 | 5/1994 | Nagase et al. . |
| 5,343,235 | 8/1994 | Fukui et al. . |

FOREIGN PATENT DOCUMENTS

| | | |
|---|---|---|
| 0332428 | 9/1989 | European Pat. Off. . |
| 0533377 | 3/1993 | European Pat. Off. . |
| 1-169454 | 7/1989 | Japan . |
| 1-172863 | 7/1989 | Japan . |

*Primary Examiner*—Robert Beatty
*Attorney, Agent, or Firm*—Fitzpatrick, Cella, Harper & Scinto

[57] ABSTRACT

An image forming apparatus has an electrophotographic photosensitive member with a support, a photosensitive layer with a thickness (T), a charging subunit, an exposure subunit, a developing subunit, and a transfer subunit. The exposure subunit illuminates the charged photosensitive member with a light beam having a spot area (S), such that the product S×T is 5,000–12,000 $\mu m^3$.

20 Claims, 4 Drawing Sheets

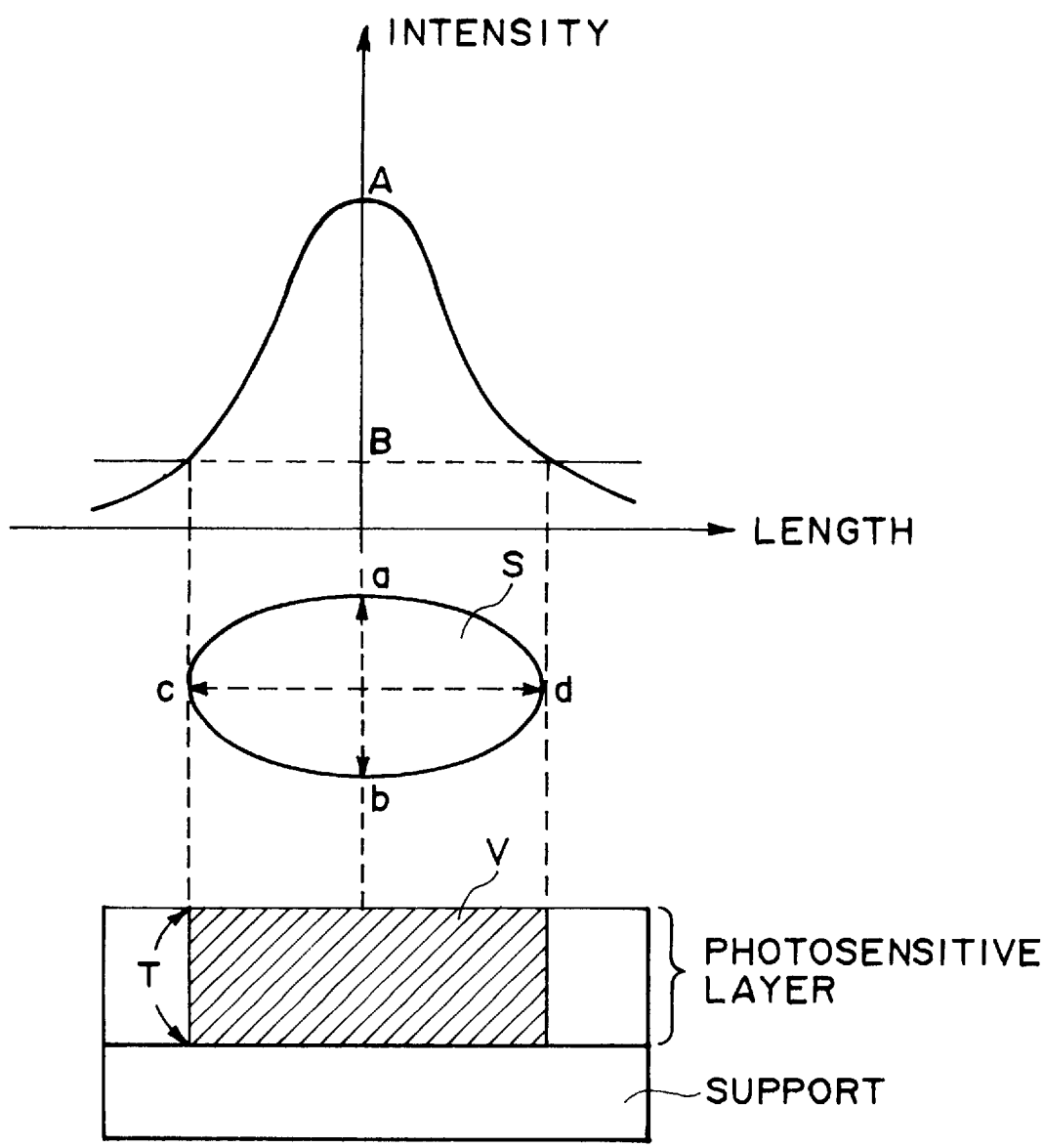
F I G. 1

IMAGE FORMING APPARATUS AND PROCESS CARTRIDGE HAVING EXPOSURE DEVICE USING LIGHT BEAM HAVING SPECIFIC SPOT AREA

FIELD OF THE INVENTION AND RELATED ART

The present invention relates to an image forming apparatus using a specific electrophotographic photosensitive member and a specific exposure means, and a process cartridge using the photosensitive member.

Among known image forming apparatus, there are laser beam printers using electrophotography, which are known as high-speed and low-noise printers. A representative recording method thereof includes binary recording of forming images, such as characters and figures, depending on whether or not a particular portion of photosensitive member is irradiated with a laser beam. Further, a certain type of printer based on such a binary recording scheme can exhibit halftones.

Well-known examples of such printers may include those utilizing the dither method and the density pattern method. However, as is well known, it is difficult for such a printer based on the dither method or the density pattern method to provide a high resolution.

On the other hand, in recent years, the PWM (pulse width modulation) scheme has been proposed as a scheme for forming a halftone at each pixel while retaining a high resolution and without lowering the recording density. According to this scheme, the laser beam irradiation time is modulated based on image signals to form halftone pixels. According to the PWM scheme, an area gradation image can be formed with a dot formed by a beam spot for each pixel, so that a halftone can be exhibited without lowering the resolution. Accordingly, this scheme is particularly suitable for a color image forming apparatus requiring a high resolution and a high gradation characteristic in combination.

Even in the PWM scheme, however, if the pixel density (or picture element density) is further increased, the pixel size is decreased relative to the exposure spot diameter, so that it is liable to be difficult to realize sufficient gradation levels even if the exposure time is modulated. For this reason, in order to provide a higher resolution while retaining the gradation characteristic, it is necessary to provide a smaller exposure spot diameter. In order to accomplish this in a scanning optical system, for example, it becomes necessary to use a laser beam having a shorter wavelength or an f-θ lens having a larger NA (numerical aperture). According to these measures, however, it becomes necessary to use expensive laser and large-sized lens and scanner and also require an increased mechanical accuracy corresponding to a lowering in focal depth, thus inevitably resulting in an increase in apparatus size and an increase in production cost. Further, even in case of using a solid state scanner, such as an LED array or a liquid crystal shutter array, it is difficult to avoid an increase in cost of the scanner, a required increase in affixing accuracy and an increase in cost of electrical drive circuit.

In spite of existing problems as described above, an image forming apparatus according to the electrophotographic scheme has been required to exhibit even higher resolution and gradation characteristic in recent years.

In these circumstances, there have been proposed various methods for improving a resolution and gradation characteristic by using a toner having a smaller particle size at the time of development or providing uniform development conditions. However, these methods have failed to provide a sufficient reproducibility of gradation data, such as full-color image data with 256 gradation levels and 400–600 lines which can be discerned by visual (eye) observation and also to sufficiently reproduce a binary image, such as characters, with a high resolution.

On the other hand, there has been proposed a method using an electrophotographic photosensitive member having a characteristic such that it shows a low sensitivity at a low exposure energy and a higher sensitivity at an increasing exposure energy in, e.g., Japanese Laid-Open Patent Application (JP-A) 1-169454 or 1-172863. According to this method, such a photosensitive member provides a low sensitivity at the low exposure energy portion of an illumination spot, so that it has become possible to attain an effect similar to that of the smaller illumination spot diameter and also to stably obtain a high resolution which is higher than a resolution expected by the illumination spot diameter. However, even if the photosensitive member is used, it has been difficult to stably reproduce gradation images of 400 lines by using the PWM scheme.

As described above, a discernible image by the naked eye generally includes 400 lines and 256 gradation levels. In this instance, the minimum resolution is of the order of 16 $\mu m^2$ corresponding to a resolution of at least 5000 dpi (dots/inch). In order to realize such a high resolution, it is necessary to provide at least a smaller spot area of light. However, in the case of only minimizing a spot area, high quality images as described above have not been formed.

SUMMARY OF THE INVENTION

An object of the present invention is to provide an image forming apparatus and a process cartridge each capable of providing an image having a high resolution and an excellent gradation characteristic.

According to the present invention, there is provided an image forming apparatus, comprising: an electrophotographic photosensitive member including a support and a photosensitive layer disposed on the support, charging means for charging the photosensitive member, exposure means for illuminating the charged photosensitive member with light, developing means, and transfer means; wherein the exposure means illuminates the charged photosensitive member with a light beam having a spot area (S) and the photosensitive layer has a thickness (T), S and T providing S×T of at most 20,000 $\mu m^3$.

According to the present invention, there is also provided a process cartridge, comprising: an electrophotographic photosensitive member including a support and a photosensitive layer disposed on the support; and at least one means selected from the group consisting of charging means, developing means, and cleaning means; wherein the photosensitive layer is illuminated with an exposure light beam having a spot area (S) and has a thickness (T), S and T providing S×T of at most 20,000 $\mu m^3$, and the photosensitive member and the at least one means selected from the group consisting of charging means, developing means, and cleaning means are integrally supported to form a cartridge which is detachably mountable to an image forming apparatus main body.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a set of views showing a relationship between a light intensity distribution and a spot diameter and a relationship between a spot area (S) of light and a thickness (T) of a photosensitive layer.

DETAILED DESCRIPTION OF THE INVENTION

Figure 2:
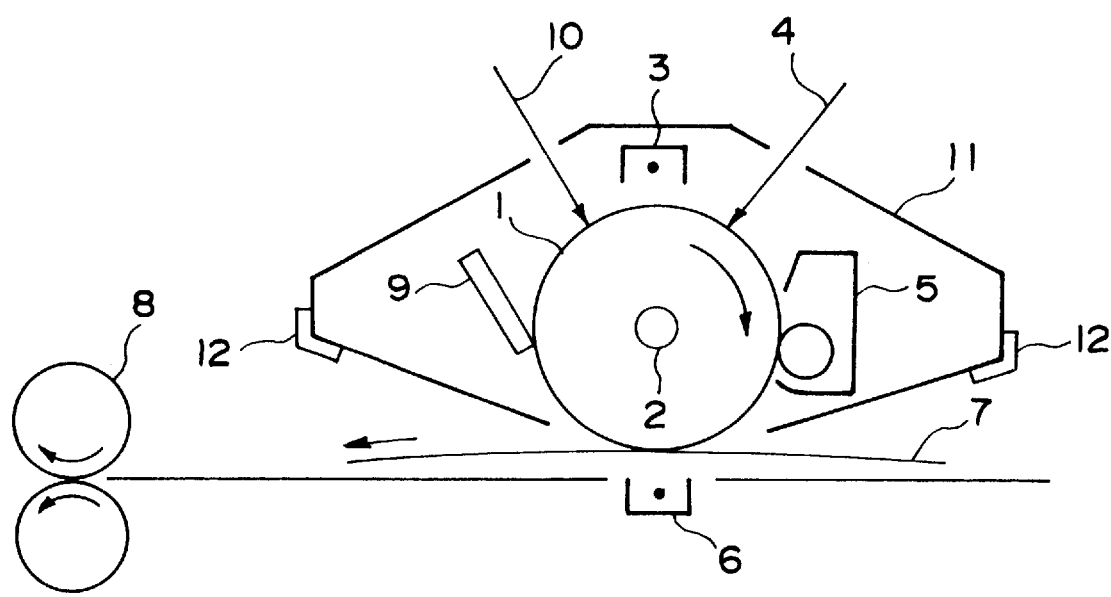
FIG. 2 is a schematic illustration of an embodiment of the image forming apparatus according to the present invention.

In the image forming apparatus and process cartridge, the product of a spot area (S) of an exposure light and a thickness (T) of a photosensitive layer, i.e., S×T, is 20,000 $\mu m^3$ or below. By providing an S×T value of at least 20,000 $\mu m^3$, the image forming apparatus and process cartridge according to the present invention can provide excellent images having a high resolution and a good gradation reproducibility.

This may be attributable to the following phenomenon.

More specifically, in a photosensitive layer of the above image forming apparatus (and process cartridge), it has been found that image data given by a light spot is not readily deteriorated because diffusion of a (charge) carrier for forming an electrostatic latent image can be suppressed. In addition, based on improvement in potential contrast caused by the thus formed electrostatic latent image within the photosensitive layer, so that it has been confirmed that a potential contrast within a space between a photosensitive member and a developing sleeve can be enhanced. As a result, the given image data is not readily deteriorated to provide a high quality image.

The product (S×T) may preferably be at least 2,000 $\mu m^3$ in view of a development contrast (i.e., a potential difference on a photosensitive member at the time of development). If a value of S×T is below 2,000 $\mu m^3$, it is liable to be difficult to provide a sufficient development contrast.

An exposure means adopted in the present invention is used for forming an electrostatic latent image on the photosensitive member by illuminating the surface of the photosensitive member with a light beam issued from the exposure means, thus providing the photosensitive member surface with a dot-like spot. In this instance, the exposure means may preferably be a light source emitting a laser light (laser beam) or LED light beam (light beam issued from LED) in order to readily provide the dot-like spot with a smaller spot area.

FIG. 1 shows a relationship between a light intensity distribution and a spot diameter. FIG. 1 also shows a relationship between a spot area (S) of light and a thickness (T) of a photosensitive layer. Referring to FIG. 1, the light spot generally has a shape of an ellipse having a spot diameter (ab) in a main (or horizontally) scanning direction and a spot diameter (cd) in a sub-scanning (or vertically scanning) direction. The product S×T corresponds to a volume (V) of the light spot. The light spot area (S) is an area at the surface of the photosensitive layer wherein a light intensity (B) which is $1/e^2$ of the peak intensity (A) or a light intensity in the range of above B to A is provided.

In the present invention, examples of a light source (as exposure means) for providing the light spot may include a semiconductor laser or an LED.

The light intensity distribution may be based on Gaussian distribution or Lorentz distribution. In either case, the spot area (S) referred to in the present invention provides a light intensity distribution as shown in FIG. 1 wherein a light intensity ranges from B to A (B is $1/e^2$ of A). The spot area (S) can be determined based on observation through a CCD camera disposed in the position of a photosensitive member.

In the present invention, the spot area (S) of light may preferably be at most 4,000 $\mu m^2$, more preferably at most 3,000 $\mu m^2$. If the spot area (S) exceeds 4,000 $\mu m^2$, the light spot having the spot area is liable to overlap with adjacent light spots, thus resulting in an unstable gradation reproducibility. Further, in view of production cost, the spot area (S) may preferably be at least 1,000 $\mu m^2$.

The photosensitive layer of the photosensitive member used in the image forming apparatus (and process cartridge) of the present invention may preferably have a thickness (as an overall thickness) of at most 10 $\mu m$, particularly at most 8 $\mu m$ in order to obtain an excellent image. On the other hand, in view of a possibility of an occurrence of a pinhole or lowering in photosensitivity, the photosensitive layer may preferably have a thickness (as an overall thickness in case of having function-separation type layer structure described below) of at least 1 $\mu m$, particularly at least 3 $\mu m$. The thickness of the photosensitive layer may be measured by using an eddy current-type thickness measuring apparatus.

In the present invention, the photosensitive layer may have a function-separation type structure or a single-layer type structure. More specifically, the photosensitive layer may be composed of a charge generation layer comprising a charge-generation substance and a charge transport layer comprising a charge-transporting substance disposed in this order or in reverse order (function-separation type structure) or composed of a single layer comprising a charge-generation substance and charge-transporting substance (single layer structure). Among the above layer structures, the photosensitive layer may preferably have a function-separation type structure including the charge generation layer and the charge transport layer disposed in this order on a support (described hereinafter).

Examples of the charge generation substance may include: selenium-tellurium, pyryllium dyes, thiopyryllium dyes, phthalocyanine pigments, anthoanthrone pigments, dibenzpyrenequinone pigments, pyranthrone pigments, trisazo pigments, disazo pigments, azo pigments, indigo pigments, quinacridone pigments and cyanine pigments.

Examples of the charge transporting substance may include: polymeric compounds having a heterocyclic ring or a condensed polycyclic aromatic structure, such as poly-N-vinylcarbozole and polystyrylanthracene; heterocyclic compounds, such as pyrazoline, imidazole, oxazole, oxadiazole, triazole and carbazole; triarylalkane derivatives, such as triphenylmethane; triarylamine derivatives, such as triphenylamine; and low-molecular weight compounds, such as phenylenediamine derivatives, N-phenylcarbazole derivatives, stilbene derivatives and hydrazone derivatives.

The above-mentioned charge-generation substance and charge-transporting substance may be dispersed or dissolved, as desired, in a binder polymer. Examples of the binder polymer may include; polymers or copolymers of vinyl compounds, such as styrene, vinyl acetate, vinyl chloride, acrylates, methacrylates, vinylidene fluoride and trifluoroethylene, polyvinyl alcohol, polyvinyl acetal, polycarbonate, polyester, polysulfone, polyphenylene oxide, polyurethane, cellulosic resin, phenolic resin, melamine resin, silicone resin and epoxy resin.

In addition to the above-mentioned compounds, the photosensitive layer can contain some additives for improving the mechanical properties or durability or other purposes. Examples of such additives may include; antioxidant, ultraviolet absorber, crosslinking agent, lubricant and electroconductivity controller.

In the present invention, the photosensitive layer may preferably have a smaller thickness (e.g., 1–10 µm) as described above, so that a protective layer may preferably be disposed on the photosensitive layer. The protective layer may preferably have a thickness of 1–5 µm. Below 1 µm, the protection effect thereof is liable to become insufficient. Above 5 µm, the protective layer is liable to have a lowered surface potential. The protective layer may preferably contain various resins and, a desired, may further contain electroconductive particles composed of metal, metal oxide, etc.

The electrophotographic photosensitive member used in the present invention may be prepared by forming at least a photosensitive layer on a support.

The support may be composed of a material which per se has an electroconductivity, e.g., a metal, such as aluminum, aluminum alloy, copper, zinc, stainless steel, chromium, titanium, nickel, magnesium, indium, gold, platinum, silver, or iron. Alternatively, the support may comprise a plastic material coated, e.g., with a vapor-deposited film of aluminum, indium oxide, tin oxide or gold, or a coating layer of electroconductive particles together with an appropriate binder on a support of a metal or plastic; or a plastic material or paper in mixture with electroconductive particles. The support may be formed in a shape of, e.g., a cylinder endless belt or sheet.

In the photosensitive member used in the present invention, it is also possible to dispose an undercoating layer having an injection barrier function and an adhesive function between the support and the photosensitive layer. Such an undercoating layer may be formed of, e.g., casein, polyvinyl alcohol, nitrocellulose, ethylene-acrylic acid copolymer, polyvinyl butyral, phenolic resin, polyamide, polyurethane or gelatin. The undercoating layer may preferably have a thickness of 0.1–10 µm, particularly 0.3–3 µm.

The image forming apparatus according to the present may include a support, an electrophotographic photosensitive member, a charging means, an exposure means, a developing means, a transfer means and a cleaning means.

In the image forming apparatus of the present invention, the above-mentioned various means (e.g., charging means, developing means, transfer means and cleaning means) may be those known in the art. The charging means may preferably be a corona charging means charging the photosensitive member by utilizing corona generated by applying a high voltage to a wire or a contact charging means charging the photosensitive member by applying a voltage to a member, such as a roller, blade or brush, disposed so as to contact the surface of the photosensitive member. In order to attain a high development effect, the developing means may preferably adopt a dry development scheme, particularly a dry and non-contact development scheme susceptible to a potential contrast between the photosensitive member and a developing sleeve.

In the present invention, a toner used in the development step may preferably have a weight-average particle size of 2–10 µm.

FIG. 2 is a schematic sectional view of a first embodiment of an image forming apparatus including a process cartridge according to the present invention.

Referring to FIG. 2, a photosensitive drum (i.e., electrophotographic photosensitive member) 1 is rotated about an axis 2 at a prescribed peripheral speed in the direction of the arrow shown inside of the photosensitive member 1. The surface of the photosensitive member 1 is uniformly charged by means of a primary charging means 3 while being rotated to have a prescribed positive or negative potential. The photosensitive member 1 is exposed to light-image 4 (an exposure light beam) as by laser beam-scanning exposure by using an imagewise exposure means (not shown), whereby an electrostatic latent image corresponding to an exposure image is successively formed on the surface of the photosensitive member 1. The thus formed electrostatic latent image is developed by a developing means 5 to form a toner image on the photosensitive member surface. The toner image is successively transferred to a transfer-receiving material 7 which is supplied from a paper-supply part (not shown) to a position between the photosensitive member 1 and a transfer means 6 in synchronism with the rotating speed of the photosensitive member 1, by means of the transfer means 6.

The transfer-receiving material 7 with the toner image thereon is separated from the photosensitive member surface to be conveyed to an image-fixing device 8, followed by image fixing to be printed out as a copy out of the image forming apparatus. Residual toner particles on the surface of the photosensitive member 1 after the transfer are removed by means of a cleaning means 9 to provide a cleaned surface, and residual charge on the surface of the photosensitive member 1 is erased by a pre-exposure light 10 emitted from a pre-exposure means (not shown) to prepare for the next cycle. In case where a contact charging means using, e.g., a charging roller is used as a primary charging means, the pre-exposure step may be omitted.

In the present invention, a plurality among the above-mentioned structural elements inclusive of the photosensitive member 1, the primary charging means 3, the developing means 5 and the cleaning means 9 can be integrally supported to form a single unit as a process cartridge 11 which is detachably mountable to a main body of an image forming apparatus, such as a copying machine or a laser beam printer, by using a guide means such as a rail 12 in the body.

For example, at least one of the primary charging means 3, developing means 5 and cleaning means 9 may be integrally supported together with the photosensitive member 1 to form a process cartridge 11.

Figure 3:
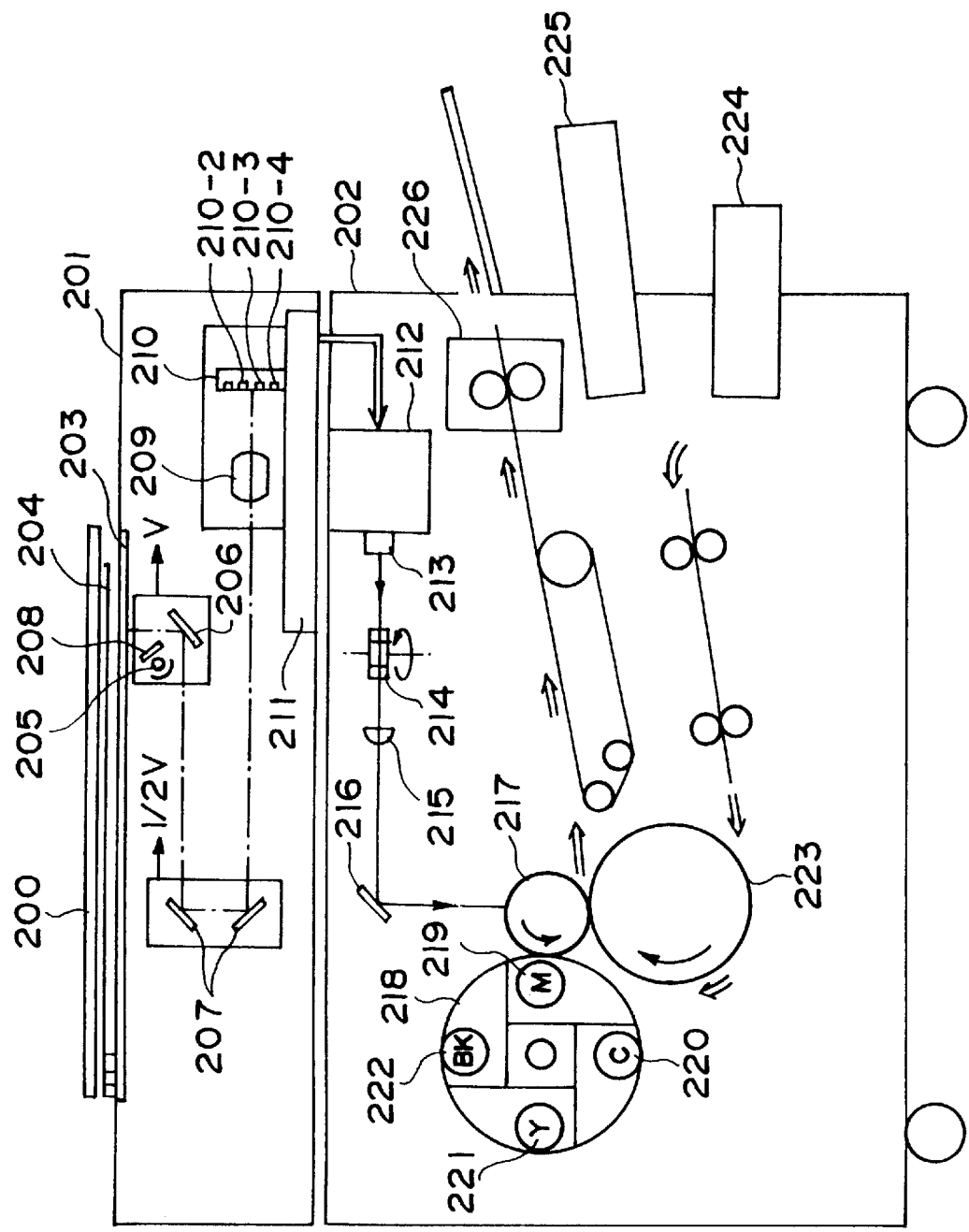
FIG. 3 is a schematic illustration of another embodiment of the image forming apparatus according to the present invention.

FIG. 3 is a schematic sectional view of a color copying machine as a second embodiment of the image forming apparatus according to the present invention.

Referring to FIG. 3, the color copying machine include an image scanning unit 201 for performing operations wherein image data on an original are read out and subjected to digital signal processing, and a printer unit 202 wherein a full-color image corresponding to the original image read out by the image scanning unit 201 is printed out onto a sheet.

More specifically, in the image scanning unit 201, an original 204 disposed on an original glass plate 203 and covered with an original cover 200 is illuminated with a light issued from a halogen lamp 205 via an infrared-cutting (or screening) filter 208. A reflected light from the original is successively reflected by mirrors 206 and 207 and passes through a lens 209 to be imaged in a 3-line sensor (CCD sensor), and then is sent to a signal processing unit 211 as full-color data components of red (R), green (G) and blue (B). The halogen lamp 205 and the mirror 206 are mechanically moved at a velocity (V) and the mirrors 207 are mechanically moved at a velocity (½ V) each in a direction (sub-scanning direction) perpendicular to an electrically scanning direction (primary scanning direction) of the line sensor 210 (composed of 210-2, 210-3 and 210-4), thus performing scanning over the entire original.

At the signal processing unit 211, readout signals are electrically processed to be resolved into respective components composed of magenta (M), cyan (C), yellow (Y) and black (B) and are sent to the printer unit 202. Among the above components M, C, Y and B, one component is sent to the printer unit 202 for one scanning operation of the original at the image scanning unit 201. Accordingly, one printout operation (one cycle of color image formation) is performed by four scanning operations in total.

At the printer unit, the image signals for M, C, Y and BK sent from the image scanning unit 201 are sent to a laser driver 212. In accordance with the image signals, the laser driver 212 modulation-drives (modulation-activates) a semiconductor laser 213. The surface of a photosensitive member 217 is scanned with a laser beam (or laser light) via a polygonal mirror 214, a f-θ lens 215 and a mirror 216, whereby electrostatic latent images are successively formed on the photosensitive member 217 corresponding to the original image.

The thus formed electrostatic latent images (for M, C, Y and BK) are developed with corresponding toners, respectively by a rotary developing device 218 composed of a magenta developing unit 219, a cyan developing unit 220, a yellow developing unit 221 and a black developing unit 222 each successively contacting the photosensitive member 217 to form toner images of M, C, Y and BK.

The thus developed toner images formed on the photosensitive member are successively transferred onto a sheet (e.g., a PPC paper as a transfer-receiving material) supplied from a cassette 224 or a cassette 225 by using a transfer drum 223 about which the sheet is wound.

After the transfer step wherein four color images of M, C, Y and BK are successively transferred onto the sheet, the sheet passes through a fixation unit 226 to be conveyed out of the image forming apparatus body.

Hereinbelow, an example based on the above-mentioned second embodiment of the image forming apparatus will be described.

[EXAMPLE]

An image forming apparatus used in this example included a semiconductor laser of 680 nm (wavelength) and 35 mW (output) used as a light source (exposure means). The semiconductor laser issued a laser beam providing a fixed spot diameter in a sub-scanning direction of 63.5 $\mu$m corresponding to 400 dpi and different spot diameters in a primary scanning direction on an electrophotographic photosensitive member, thus providing various values of a spot area (S) including 1250 $\mu$m$^2$, 2000 $\mu$m$^2$, 3000 $\mu$m$^2$ and 5000 $\mu$m$^2$.

An electrophotographic photosensitive member was prepared by forming an electroconductive layer, an undercoating layer, a charge generation layer and a charge transport layer in this order on an aluminum cylinder. The charge generation layer contained oxytitaniumphthalocyanine and had a thickness of 0.1 $\mu$m. Further, the charge transport layer contained a triarylamine compound and had a thickness of 3.9 $\mu$m, whereby a resultant function separation-type photosensitive layer had a thickness (T) of 4.0 $\mu$m.

In the same manner as above, electrophotographic photosensitive members were prepared by changing the thickness (T) of the photosensitive layer to 8 $\mu$m, 15 $\mu$m and 25 $\mu$m, respectively.

Each of the thus prepared photosensitive members was negatively charged and exposed to the above laser beam, followed by dry and non-contact development with a negatively charged-magnetic monocomponent toner having a particle size of 6.5 $\mu$m to form a toner image.

The thus obtained toner image was evaluated by visual observation and using a Macbeth reflection densitometer in terms of gradation reproducibility.

Figure 4:
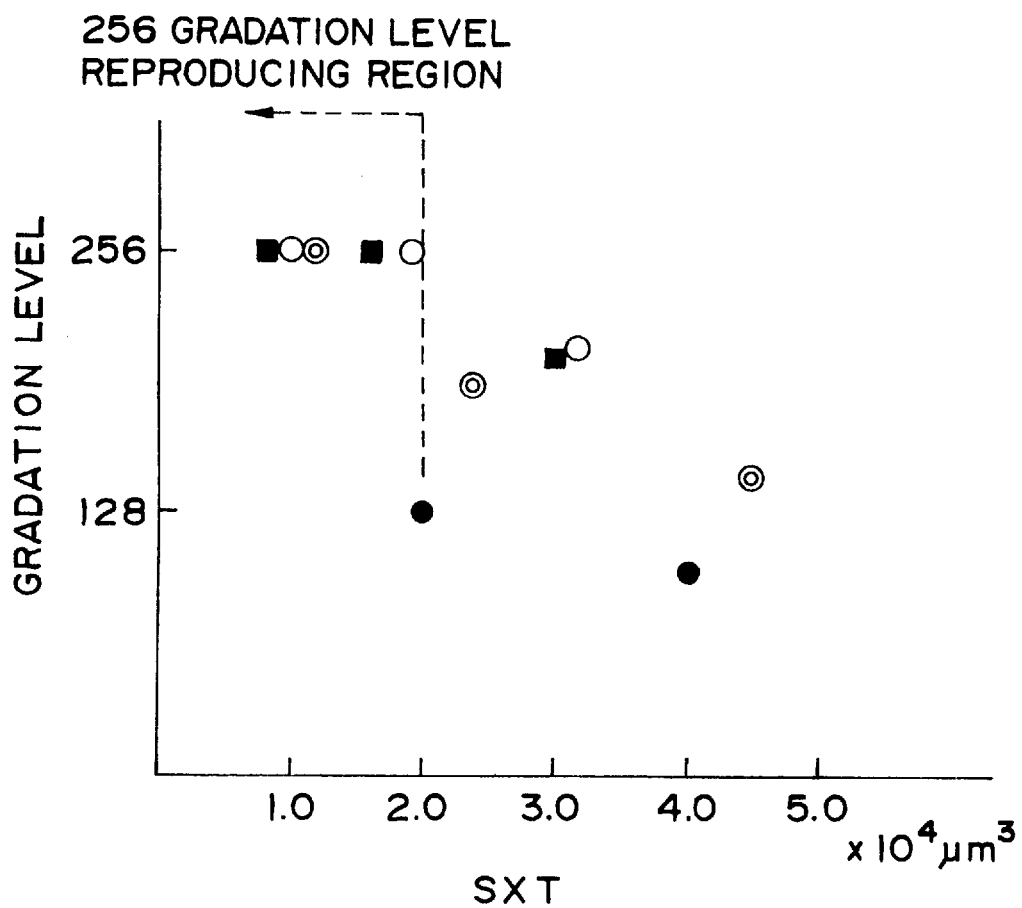
FIG. 4 a graph showing a relationship between a gradation characteristic and the product of a spot area (S) and a photosensitive layer thickness (T).

The results are shown in FIG. 4. In FIG. 4, the respective symbols represented the following spot areas (S), respectively.

○:1250 $\mu$m$^2$
■:2000 $\mu$m$^2$
◎:3000 $\mu$m$^2$
●:5000 $\mu$m$^2$

As apparent from FIG. 4, when the product (S×T) was at most 20,000 $\mu$m$^3$ in the cases of the spot areas (S) of 1250 $\mu$m$^2$, 2000 $\mu$m$^2$ and 3000 $\mu$m$^2$, a good gradation reproducibility including 400 dpi and 256 gradation levels was confirmed. On the other hand, when the product (S×T) exceeded 20,000 $\mu$m$^3$, a gradation reproducibility was insufficient.

In the case of the spot area (S) of 5000 $\mu$m$^2$, 256 gradation levels were not obtained even in a region providing the product (S×T) of at most 20,000 $\mu$m$^3$. This may be attributable to a larger spot diameter of 100 $\mu$m susceptible to adjacent pixels (spots).

What is claimed is:

1. An image forming apparatus comprising: an electrophotographic photosensitive member including a support and a photosensitive layer disposed on the support, charging means for charging the photosensitive member, exposure means for illuminating the charged photosensitive member with light, developing means, and transfer means; wherein
   said exposure means illuminates the charged photosensitive member with a light beam having a spot area (S) of at most 4,000 $\mu$m$^2$ and said photosensitive layer has a thickness (T), S and T providing S×T of 5,000–12,000 $\mu$m$^3$.

2. An apparatus according to claim 1, wherein said spot area (S) is at most 3,000 $\mu$m$^2$.

3. An apparatus according to claim 1, wherein said spot area (S) is at least 1,000 $\mu$m$^2$.

4. An apparatus according to claim 1, wherein said photosensitive layer has a thickness (T) of at most 10 $\mu$m.

5. An apparatus according to claim 4, wherein said photosensitive layer has a thickness (T) of at most 8 $\mu$m.

6. An apparatus according to claim 4, wherein said photosensitive layer has a thickness (T) of at least 1 $\mu$m.

7. An apparatus according to claim 4, wherein said photosensitive layer has a thickness (T) of at least 3 $\mu$m.

8. An apparatus according to claim 1, wherein said light beam is a laser beam or an LED light beam.

9. An apparatus according to claim 1, wherein said developing means is dry developing means.

10. An apparatus according to claim 9, wherein said developing means is non-contact developing means.

11. A process cartridge, comprising: an electrophotographic photosensitive member including a support and a photosensitive layer disposed on the support; and at least one means selected from the group consisting of charging means, developing means, and cleaning means, wherein
   said photosensitive layer is illuminated with an exposure light beam having a spot area (S) of at most 4,000 $\mu$m$^2$ and has a thickness (T), S and T providing S×T of 5,000–12,000 $\mu m^3$, and said photosensitive member and said at least one means selected from the group consisting of charging means, developing means, and cleaning means are integrally supported to form a cartridge which is detachably mountable to an image forming apparatus main body.

12. A process cartridge according to claim 11, wherein said spot area (S) is at most 3,000 $\mu m^2$.

13. A process cartridge according to claim 11, wherein said spot area (S) is at least 1,000 $\mu m^2$.

14. A process cartridge according to claim 11, wherein said photosensitive layer has a thickness (T) of at most 10 $\mu m$.

15. A process cartridge according to claim 14, wherein said photosensitive layer has a thickness (T) of at most 8 $\mu m$.

16. A process cartridge according to claim 14, wherein said photosensitive layer has a thickness (T) of at least 1 $\mu m$.

17. A process cartridge according to claim 14, wherein said photosensitive layer has a thickness (T) of at least 3 $\mu m$.

18. A process cartridge according to claim 11, wherein said light beam is a laser beam or an LED light beam.

19. A process cartridge according to claim 11, wherein said developing means is dry developing means.

20. A process cartridge according to claim 19, wherein said developing means is non-contact developing means.

* * * * *